No. 886,580. PATENTED MAY 5, 1908.
W. M. CONNER.
POULTRY FEEDER AND EXERCISER.
APPLICATION FILED MAR. 29, 1907.
2 SHEETS—SHEET 1.
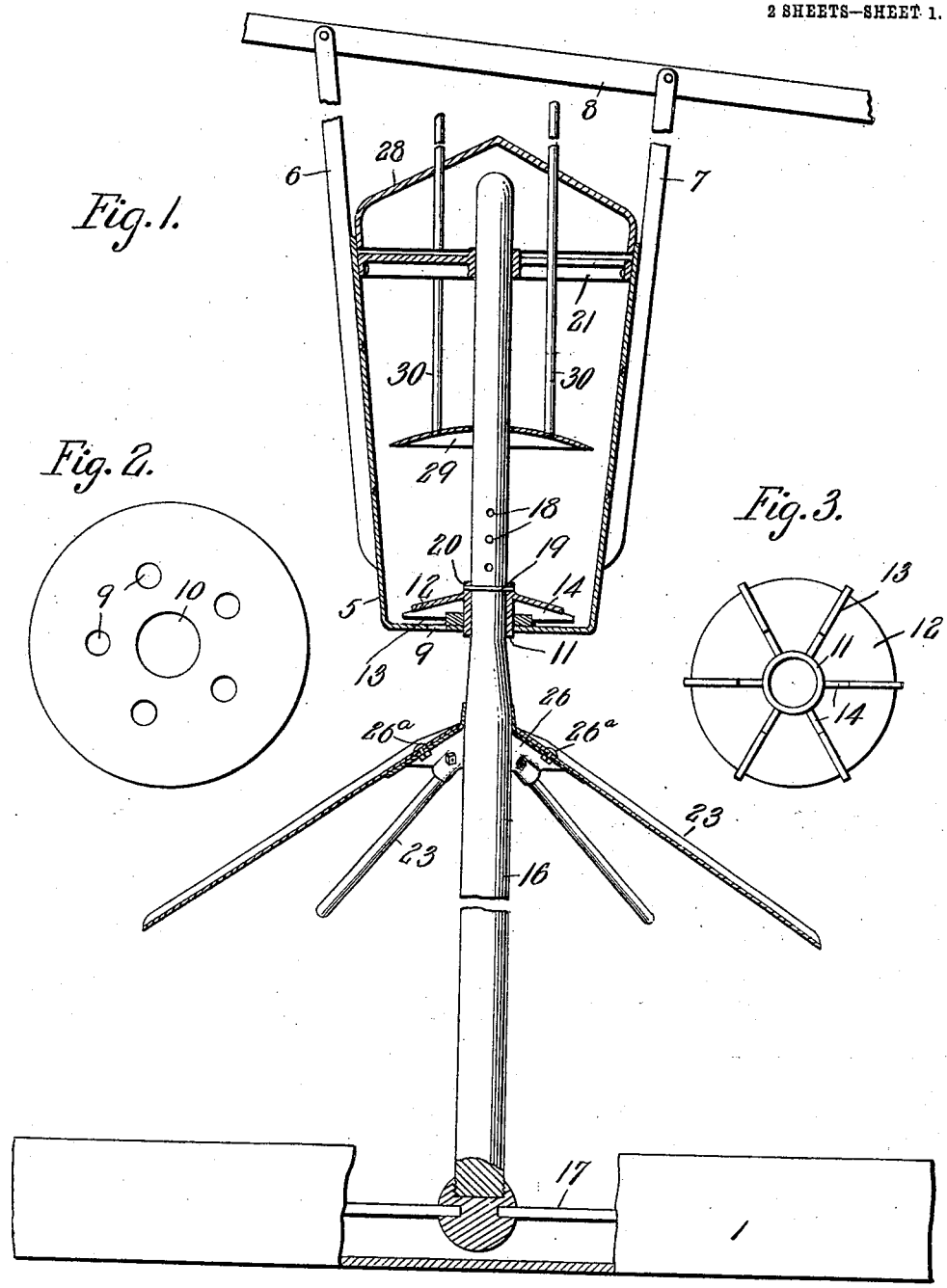

No. 886,580. PATENTED MAY 5, 1908.
W. M. CONNER.
POULTRY FEEDER AND EXERCISER.
APPLICATION FILED MAR. 29, 1907.

2 SHEETS—SHEET 2.

Witnesses
Jos. F. Collins
H. H. Simms

Inventor
William M. Conner
by Knight Bros
Attorneys

UNITED STATES PATENT OFFICE.

WILLIAM M. CONNER, OF CINCINNATI, OHIO.

POULTRY FEEDER AND EXERCISER.

No. 886,580.          Specification of Letters Patent.          Patented May 5, 1908.

Application filed March 29, 1907. Serial No. 365,345.

*To all whom it may concern:*

Be it known that I, WILLIAM M. CONNER, a citizen of the United States, residing at Cincinnati, in the county of Hamilton, State of Ohio, have invented certain new and useful Improvements in Poultry Feeders and Exercisers, of which the following is a specification.

This invention relates to poultry feeders and exercisers.

Poultry when housed do not secure sufficient exercise and as a consequence do not lay, thus becoming to the breeder a loss instead of a profit.

Various devices have been devised to give them the needed exercise and in some of these devices has been recognized the fact that poultry must have some incentive to operate the device. For instance, a feeder has been so connected to the exercising device that as the poultry operate the device, feed is supplied to them.

An object of my invention is to provide an improved feeder and exerciser which will be inexpensive to manufacture, simple in operation and durable in use.

Another object of the invention is to provide a device of this type in which the feed of the feeder may be regulated.

A still further object is to provide a distributer which may be folded into small compass for the purpose of shipment and which will positively throw the feed various distances from the feeder.

With these and other objects in view, the invention consists of the parts and combination of parts shown in the accompanying drawings, hereinafter described, and more particularly pointed out in the appended claims.

Figure 4:
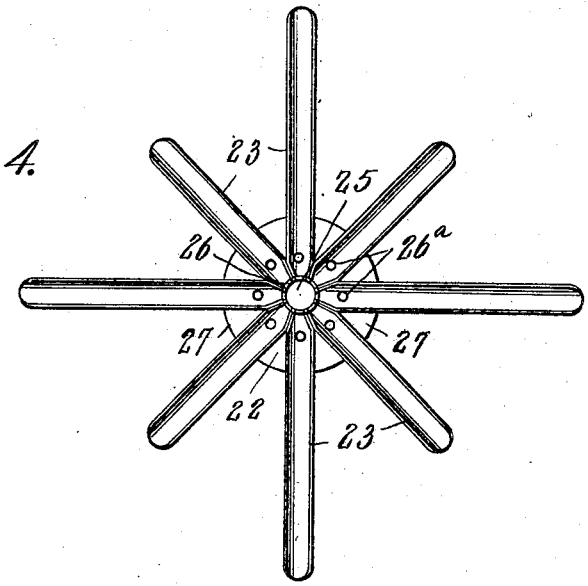
Figure 5:
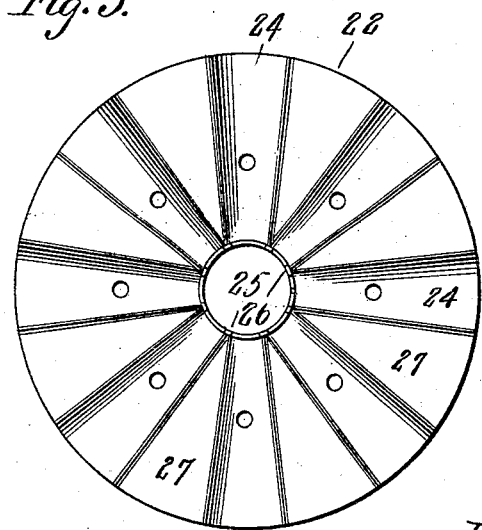
Figure 6:
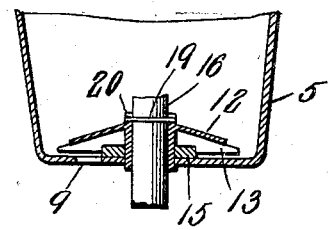
Figure 7:
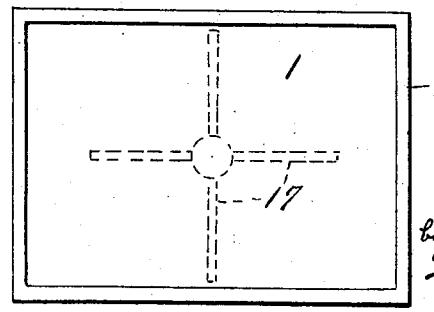

In the drawings, Figure 1 is a view of my invention partly in vertical section and partly in elevation. Fig. 2 is a plan view of the bottom of the hopper. Fig. 3 is a bottom view of the feeding disk. Fig. 4 is a top view of the distributer. Fig. 5 is a top view of the central portion of the distributer. Fig. 6 is a detail sectional view of the feeding disk in an adjusted position. Fig. 7 is a plan view of the box over which the feeder is suspended.

Referring more particularly to the drawings, 1 indicates a rectangular feeding box which is preferably placed in one corner of a poultry house with the walls 2 and 3 abutting the walls of the house. The feeding box should contain straw, sand or other material in which the poultry may scratch.

Within the feeding box is arranged the feeder and exerciser which is preferably suspended from the roof of the poultry house. For this purpose, the hopper 5 has secured to it a pair of uprights 6 and 7 one of which is longer than the other, so that they may be secured to an inclined rafter 8.

The bottom of the hopper 5 is provided with an annular series of openings 9 and a central opening 10. In the latter turns with little friction, the depending sleeve 11 of a hollow cone shaped disk 12, which is provided with radial propellers or ribs 13. These ribs project beyond the periphery of the disk and gather in the feed, conducting it to the openings 9. The shape of the disk causes the formation of a chamber which gradually increases in height toward the center of the disk and thus prevents clogging. The cone-shape of the disk also prevents the feed accumulating on the top of the disk.

The inner ends of the ribs are cut away at 14 to receive an annular washer 15, as shown in Fig. 6, which washer serves as a means for holding the disk in an elevated position above the bottom of the hopper and thus increases the feed of the feeding disk. Of course, any number of washers may be employed or washers of different thicknesses may be used to get different elevations of the disk.

The disk is rotated by means of a rod 16 which depends from the disk to a point near the bottom of the feeding box where it is provided with radial impelling arms 17. These arms are engaged by the legs or the body of the poultry when the latter scratch in the feeding box, causing the rod or shaft 16 to be rotated and thus rotating the feed disk.

So that the device may be adjusted for poultry of various sizes, the vertical rod 16 is adjustably connected to the feed disk. This is accomplished by providing the rod 16 with a series of transverse bores 18 through which is passed a pin 19 which rests in two notches 20 in the top of the disk 12. To prevent the rod swinging relatively to the hopper the upper end of the rod is journaled in a spider 21 arranged in the top of the hopper or in other words, above the feed disk.

As a means for distributing the feed to all parts of the feed box, there is provided the device shown in detail in Figs. 4 and 5. This comprises a cone-shaped attaching disk 22 and grooved arms 23 of various lengths extending radially from said disk. The disk is of a diameter sufficient to catch the material dropping through openings 9 and is provided with radial grooves 24 and a central opening 25 surrounded by upturned flange 26 which secures the distributer to the rod 16 or it may be secured to the sleeve 11. The arms 23 are each provided with a longitudinal groove, and fit within the radial grooves 24, their upper ends being beveled so that they may lie close together at these points. To hold the arms in the grooves, bolts 26a are passed through the disk and through the arms. The grooves in the disk serve two functions, first, they prevent lateral movement of the arms, and second, they cause the upper edges of the arms to lie in the plane of the non-depressed portions 27 of the disk. When feed drops from the hopper it will strike either in the arms or on the non-depressed portions of the disk. If on the former, it will be carried to the outer end of the arms and discharged into the feeding box. If on the other hand, the feed strikes the disk, then it will either be directed into the grooved arms or be carried to the edge of the disk and discharged into the feeding box. In this manner the feed is directed to all portions of the feeding box and the poultry will be compelled to scratch in all parts of the box to get food, thereby moving the propellers often and giving a continuous supply of food. The feed hopper is closed by a cover 28 which is of conical formation to prevent the poultry roosting thereon.

To ascertain when the feed hopper needs refilling, there is provided a gage in the form of a disk 29 which rests on the top of the feed and has extending upwardly therefrom, two rods 30 which pass through the cover 28. Of course, when the feed hopper is empty, the rods 30 will be lowered and vice versa. The manner of connecting the rod to the feeding disk prevents the feeding device clogging, a usual occurrence in devices of this kind. The annular series of discharge openings 9 prevent a continuous feed from the hopper for, even though the feed passes under the disk, it will in most instances, remain on those portions of the bottom between the openings and from here it is carried to the openings by the ribs.

Having thus described the invention, what is claimed and desired to be secured by Letters Patent is:

1. A feeder and exerciser for poultry comprising a feed hopper, a feed disk, and a rod for rotating the disk, having means whereby the rod may be rotated by the poultry thereon and said rod being vertically adjustable in the disk.

2. A feeder and exerciser for poultry comprising a feed hopper, a feeding means, a feed box located below the hopper, a rod for operating the feeding means and having its lower end projecting into the feed box, and radial arms extending from the lower end of the rod within the feed box.

3. A feeder and exerciser for poultry comprising a feed hopper, a feed disk in the hopper, a rod to which the feed disk is secured, projecting above and below the disk, means carried by the rod, below the feed disk whereby the rod may be rotated by the poultry, and means above the disk in which the rod is journaled.

4. A feeder and exerciser for poultry comprising a feed hopper, a feeding means, a feed box located below the hopper, a rod for operating the feeding means and having its lower end projecting into the feed box, radial arms extending from the rod at its extreme lower end and located within the feed box, and means whereby the rod may be adjusted to vary the height of said arms.

5. A feeder and exerciser for poultry comprising a feed hopper, a feed disk in the hopper, an operating rod adjustably secured to the disk and extending above the same, means whereby the rod may be rotated by the poultry, and means in which the rod is journaled, located above the feed disk.

6. A feeder and exerciser for poultry, comprising a feed hopper, a closure for the hopper, a feeding means in the hopper, means operable by the poultry for operating the feeding means, and a gage for the material in the hopper.

7. A feeder and exerciser for poultry comprising a feed hopper having a central opening and a series of openings surrounding the central opening, a feed disk having a sleeve depending into the central opening and radial ribs on its under side; and a rod for rotating the feed disk, operable by the poultry.

8. A feeder and exerciser for poultry comprising a feed hopper having openings in its bottom; a feed disk arranged in the hopper and formed to provide a chamber gradually increasing in height toward the center of the disk; and a rod for rotating the disk, operable by the poultry.

9. A feeder and exerciser for poultry comprising a hopper, having openings in its bottom; a cone-shaped disk having ribs on its under side, adapted to feed the material from the hopper through the openings; and means operable by the poultry for operating the disk.

10. A feeder and exerciser for poultry comprising a hopper having openings in its bottom; a cone-shaped disk having ribs on its under side, adapted to feed the material from the hopper through the openings; and means operable by the poultry for operating the disk; and means for elevating the disk relatively to the bottom of the hopper.

11. A feeder and exerciser for poultry comprising a feed hopper, a feeding means therein, operable by the poultry, and a distributer arranged below the hopper and formed of a plurality of radial arms of various lengths.

12. A feeder and exerciser for poultry comprising a feed hopper, a feeding means therein, operable by the poultry, and a distributer arranged below the hopper and formed of a central cone, and radial arms extending from the cone.

13. A feeder and exerciser for poultry comprising a feed hopper, a feeding means therein, operable by the poultry, and a distributer arranged below the hopper and formed of a central cone having radial grooves, and arms fitting in the grooves extending radially from the cone and longitudinally grooved.

14. A feeder and exerciser for poultry comprising a feed hopper, a feeding means therein, operable by the poultry, and a distributer arranged below the hopper and formed of a central cone having radial grooves, arms fitting in the grooves extending radially from the cone and longitudinally grooved, and means passing through the arms and the cone for securing the arms to the cone.

15. A feeder and exerciser for poultry comprising a feed hopper, a feed disk therein, a rod secured to the feed disk, and a distributer arranged below the hopper and formed of a cone having a central opening through which the rod passes and radial grooves, and arms fitting in the grooves and extending radially from the disk.

16. A feeder and exerciser for poultry comprising a feed hopper having an annular series of openings, a feed disk arranged on the bottom of the hopper and having radial ribs on its under side for feeding material through said openings, and means operated by the poultry for rotating the disk.

The foregoing specification signed at Cincinnati, Ohio, this eighteenth day of January, 1907.

WILLIAM M. CONNER.

In presence of two witnesses—
GEORGE FRANKENBERGER,
CHARLES J. INOTT.